(12) United States Patent
Baldwin et al.

(10) Patent No.: US 6,263,546 B1
(45) Date of Patent: Jul. 24, 2001

(54) APPARATUS FOR THE REMOVABLE RETENTION OF AN ITEM OF PERSONAL PROPERTY

(75) Inventors: J. Hannah Baldwin; Francine Farkus Sears, both of Stony Creek, CT (US); Joseph E. Newman, Santa Fe, NM (US)

(73) Assignee: Hers & Hers, Ltd., Stony Creek, CT (US)

( * ) Notice: Subject to any disclaimer, the term of this patent is extended or adjusted under 35 U.S.C. 154(b) by 0 days.

(21) Appl. No.: 09/360,592

(22) Filed: Jul. 26, 1999

(51) Int. Cl.[7] .................................................. A44B 21/00
(52) U.S. Cl. ..................................... 24/3.3; 24/3.9; 24/13
(58) Field of Search ............................... 24/3.3, 3.7, 3.8, 24/3.9, 13; 351/156, 157

(56) References Cited

U.S. PATENT DOCUMENTS

| 797,036 | * | 8/1905 | Whitby ..................................... 24/13 |
| 904,968 | * | 11/1908 | Kocher ..................................... 24/3.9 |
| 1,743,694 | * | 1/1930 | Tierney ..................................... 24/3.9 |
| 3,032,244 | * | 5/1962 | Zeabari ..................................... 24/3.9 |
| 4,894,887 | * | 1/1990 | Ward, II ..................................... 24/3.3 |
| 4,930,740 | * | 6/1990 | Vogt ..................................... 24/3.3 |
| 4,949,432 | * | 8/1990 | Wisniewski ............................. 24/3.3 |
| 5,408,728 | * | 4/1995 | Wisniewski ............................. 24/3.3 |
| 5,699,990 | * | 12/1997 | Seach ................................ 248/309.1 |
| 5,845,369 | * | 12/1998 | Dunchock ................................ 24/3.3 |

* cited by examiner

*Primary Examiner*—Victor N. Sakran
(74) *Attorney, Agent, or Firm*—Mitchell A. Stein; Stein & Associates, P.C.

(57) ABSTRACT

An apparatus having a back region for attachment to a surface, a front region for engagement of the item of personal property, and a substantially vertical aperture region defined within and between the front and back region. The aperture region has a topward opening for initial, vertical slidable engagement of at least a portion of the item and for retention of the item after engagement, and a chamber region below the topward opening for containment of the portion of the item after engagement. The back region substantially lies in a plane and the topward opening has an elongated, semi-circular geometry. The topward opening lies in a plane, such that an angle of incidence is created between said back region plane and said topward opening plane, and the angle of incidence is less than 90°, preferably between 30° and 60°. The topward opening terminates in a pair of dependent ramping portions, each of which connecting on one side to a respective end of the semi-circular geometry, and on the other to the chamber portion. A resiliently compressable clutching assembly for the engagement and retention of a portion of the item, is housed within and between the front and back regions comprising either an opposing pair of rollers, a wedge or pair of wedges, or a cirvalinear spring member or pair of such members.

15 Claims, 9 Drawing Sheets

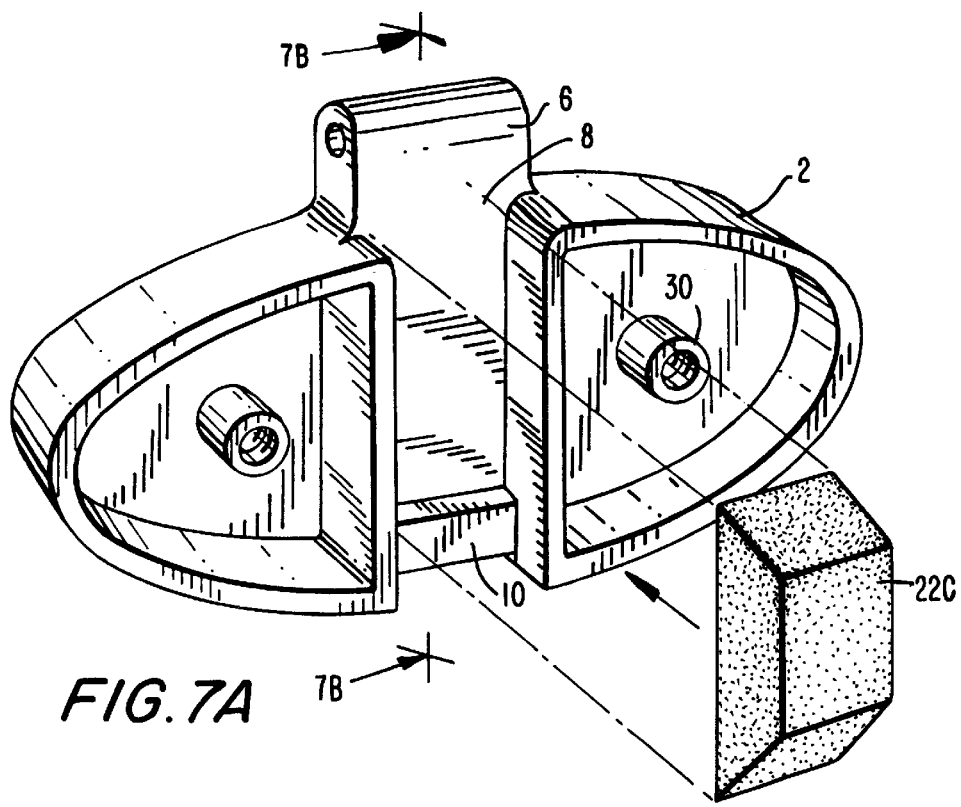
FIG.7A
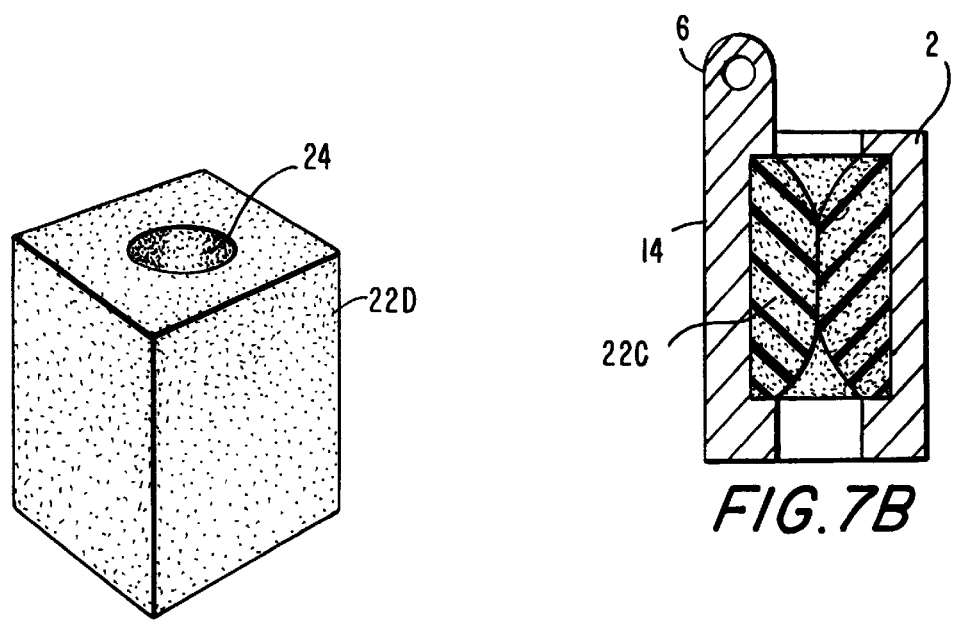
FIG.7C
FIG.7B

FIG. 8A
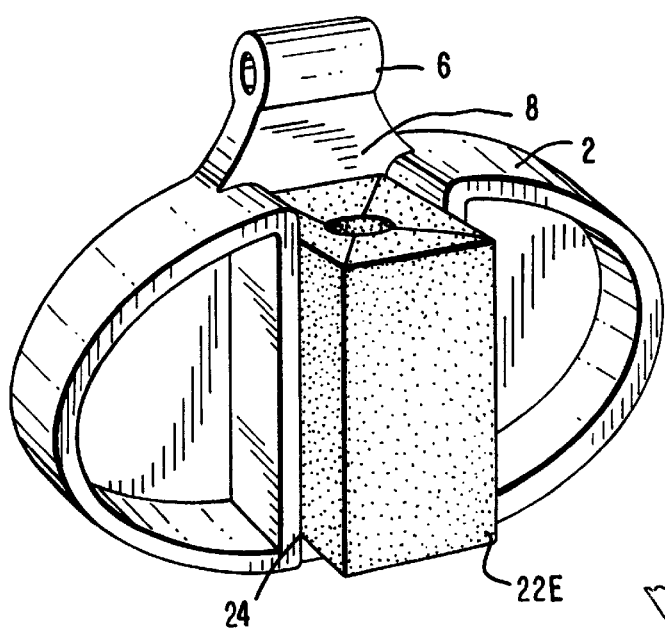
FIG. 8B
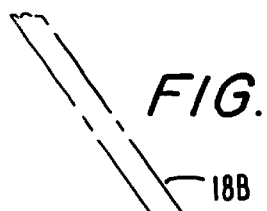
FIG. 8C
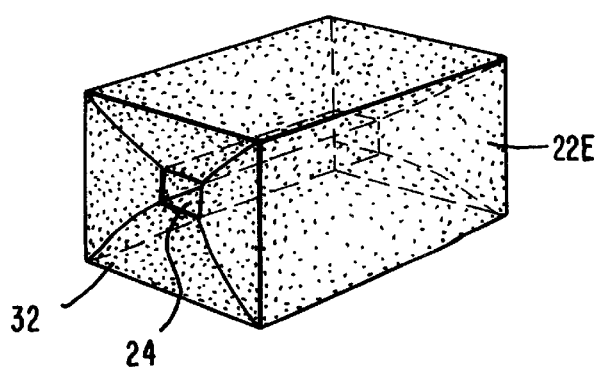
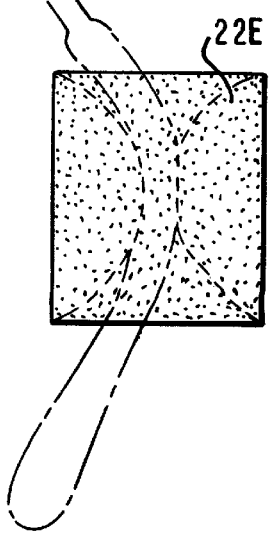

APPARATUS FOR THE REMOVABLE RETENTION OF AN ITEM OF PERSONAL PROPERTY

FIELD OF THE INVENTION

The present invention relates to the field of holders for personal property, and more particularly to devices for removable carriage of items including eye glasses, pens, lipstick holders, cellular telephones and the like.

BACKGROUND OF THE INVENTION

People are beset by the need to carry a number of small items of personal property with them, without a functional means to allow quick access and easy use. For example, eye glasses are typically held in an eye-glass holder, a box-like device that envelops the glasses, and can be worn on a belt or carried in a handbag. In order to use the glasses, however, the holder must be located, opened, and the glasses removed. Thus, access to glasses held in such a holder is restricted, and delayed.

For easier access, other holders have been observed that have a clipping or other arrangement for attaching glasses to varies surfaces, including, for example, the visor of an automobile. Such clipping assemblies, however, still leave the glasses and items of personal property out of reach of the ordinary user, unless the user is near the surface to which the clip is attached.

To overcome such problems, various mechanisms have been developed, including chains and flexible material that attach to the rearward portions of the temple sidepieces, proximate to the ear members, and are then draped about the neck. By way of advantage, these devices render glasses in easy reach. Such chains have a number of recognizable drawbacks, however. For instance, they create a generally unsightly appearance, in that such chained assemblies are typically associated with elderly people, and otherwise lack in finesse or beneficial appearance. Of greater concern is that the fact that such chained assemblies render the internal surfaces of the glasses essentially perpendicular to the body, and thus provide a safe haven or table upon which food and other material can collect, thereby obscuring the vision and requiring periodic cleaning. Additionally, such devices lack the protection afforded by the hard cases, and thus are susceptible to damage from exercise, as well as from typical human hugging contact. As a result, the hinging location of temple sidepieces to frames are rendered liable to bending or breaking.

Ornamental designs have been considered for eyeglass holders to avoid the unsightly nature of the chained assemblies, and the lack of easy access provided by cases. For example, U.S. Pat. No. Design 334,533 appears to show a design that can be attached to a vertical object for simplifying access to glasses. U.S. Pat. No. Design 350,436 shows another style of design.

Functional devices that demonstrate the need in the industry for a solution to the aforementioned problems, have also been observed. For example, U.S. Pat. No. 5,319,838 to Eppenauer appears to take advantage of the ability to hang glasses by way of the juncture or hinge between the temple side piece and the frame. Yet, Eppenauer makes no effort to avoid the slippage of such hanging that may occur when the person using the device, attached as a broach to a garment, bends over. Indeed, in Eppenauer's device, the glasses will slip out of the holder when the person is in such a position. Moreover, Eppenauer's device provides insufficient restriction against torsional movement of the device as the glasses slide within the confines of the loop provided, because the attachment to prevent such movement is a simple clip against the garment. It should be observed that the additional downward projection in Eppenauer (item 140) merely provides for attachment of an identification badge. Moreover, Eppenauer's device will provide wear of the garment, as slippage occurs. Thus, Eppenauer identifies the problems associated with eyeglass retainment in lieu of chains and cases, but does not go any significant distance in solving those problems.

U.S. Pat. No. 5,699,990 to Seach shows another system for maintaining glasses vertically, in a folded position, but is directed to allowing the assembly to be hung from a plurality of locations in a vehicle. Should the user of Seach's device leave the vehicle, then his device no longer provides any value as a retaining means for the glasses which must otherwise be carried by other means.

Another vertical folded carrying mechanism is shown by U.S. Pat. No. 5,845,369 to Dunchock, in which glasses are suspended in a container or bag 13, and attached by a fairly standard pin assembly to an article of clothing. While the bag will prevent the glasses from slipping from the holder, stress upon the garment is certain to occur. Moreover, in the absence of a suitable gannent (e.g., when a person is at the beach or is otherwise without a shirt), there is limited ability to engage the device.

Accordingly, it is an object of the instant invention to provide a mechanism for engagement of glasses or other items of personal property that are routinely carried about, in a manner that provides simple access, but does not present a risk of platform-attraction of food or damage.

It is yet another object of the instant invention to provide a mechanism for removeably holding eye glasses in a vertical, folded manner, without slippage, with greater stability and minimized torsional and rotational movement, and with easy access.

It is a further object of the instant invention to provide a mechanism for holding glasses that provides for resilient, compressable clutching of the glasses.

It is still a further object of the instant invention to provide simple, guided access for maneuvering the temple side piece of a pair of glass for proper hanging alignment.

It is yet a still further object of the instant invention to provide an ergonomically attractive device for removeable engagement of items of personal property, by, among other things, hanging the device from a chain about the neck.

SUMMARY OF THE INVENTION

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

The present invention is directed to an apparatus for the removable retention of personal property and has a back region for attachment to a surface, a front region for engagement of the item, and a substantially vertical aperture region defined within and between the front and back region. The aperture region has a topward opening for initial, vertical slidable engagement of at least a portion of the item and for retention of the item after engagement, and a chamber region below the topward opening for containment of the portion of the item after engagement. The back region substantially lies in a plane and the topward opening has an elongated, semi-circular geometry. The topward opening lies in a plane, such that an angle of incidence is created between said back region plane and said topward opening plane, and the angle of incidence is less than 90°, preferably between 30° and 60°. The topward opening terminates in a pair of dependent ramping portions, each of which connecting on one side to a respective end of the semi-circular geometry, and on the other to the chamber portion. In one embodiment, the front region and the back region are comprised of a single, unitary material. In another embodiment, the front region and the back region are openably and closeably attached, such that access to the chamber region can be had upon opening. In one embodiment, a hook is provided on an upper surface of the back region for attachment to a chain for wearing about a neck, waste or limb of a person. In a preferred embodiment, a resiliently compressable clutching assembly for the engagement and retention of a portion of the item, is housed within and between the front and back regions. This clutching assembly can be an opposing pair of rollers, a wedge or pair of wedges, or a cirvalinear spring member or pair of such members. The length and width are substantially greater than the thickness of the apparatus, and the apparatus can be metallic or of other dense material.

The invention provides the attributes of weight and geometry to increase stability, retention of personal property and ergonomic value. Retention is provided by either rolling clutching assemblies, or non-rolling wedge or spring assemblies. The aperture shape keeps glasses and other items of personal property from rotation, while providing ease of entry and tracking for proper alignment.

While the preferred embodiments below are described in connection with eyeglasses, it should be appreciated that any item of personal property that can be hooked, contained or otherwise attached to the apparatus can also be engaged by it, without deviation from either the spirit or intent of the invention.

BRIEF DESCRIPTION OF THE DRAWINGS

The present invention is further described in detail below with reference to the accompanying drawing, in which:

FIG. 7A is a disassembled, internal perspective view of an embodiment of the invention showing a wedge-shaped, resiliently compressable insert prepared for insertion into the chamber for removable attachment of personal property;

FIG. 7B is an assembled, cross-sectional view of the embodiment shown in FIG. 7A, showing dual, resiliently compressable inserts;

FIG. 7C is an alternative embodiment replacement of the compressable inserts shown in FIG. 7B comprising a cubically-configured, resiliently compressable insert within central, cylindrical chamber;

FIG. 8A is a disassembled, internal perspective view of an embodiment of the invention showing a cubically-configured insert, alternative to that shown in FIG. 7C, with a central, rectilineal chamber and sloping side walls for clutchable engagement to a temple sidepiece of a pair of eyeglasses;

FIG. 8B is perspective, cross-sectional view of the resilient, compressable insert member shown in FIG. 8A, showing a temple sidepiece clutchably engaged thereby;

FIG. 8C is a transparent, side view of the resilient, compressable insert member shown in FIG. 8A, revealing its rectilineal internal chamber;

DETAILED DESCRIPTION OF THE PREFERRED EMBODIMENTS

Figure 1:
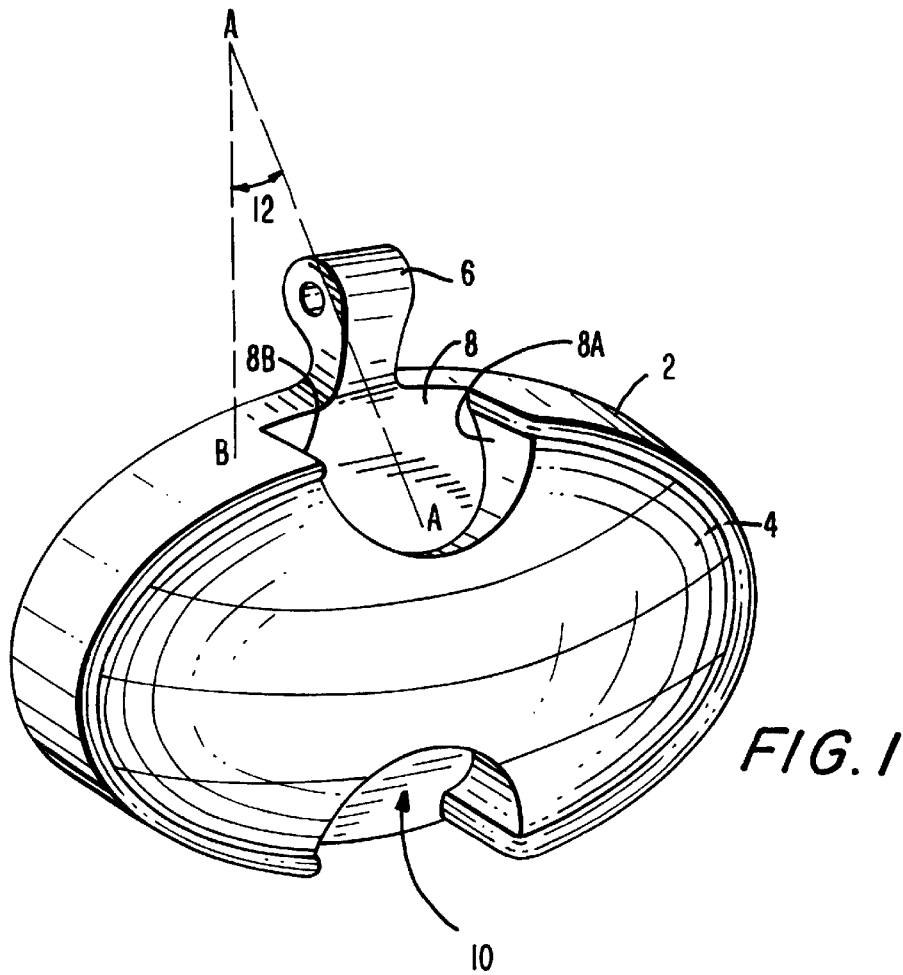
FIG. 1 is a frontal, assembled perspective view of a preferred embodiment of the subject invention showing the elongated semi-circular aperture with dependent ramping portions for glideable attachment of removable personal property.

With reference to FIG. 1, the apparatus is shown comprising rear portion 2 and front portion 4. Between front portion 4 and rear portion 2 a chamber 10 is created having a topward opening or aperture 8, which includes a semi-circular portion 8A and an elongation or ramped portions 8B. It should be observed that the plane that the semi-circular portion 8A resides in, which is along line A—A, hits the plane that back portion 4 resides in (along line A-B), and creates therebetween an angle of incidence 12, which is preferentially less than 90°, and more preferentially between 30° and 60°. In this manner, aperture 8 is larger in square dimensions than would be the case if the angle of incidence 12 were 90°, thereby increasing the size of aperture 8 and creating a greater target area for insertion of a temple side piece or other portion of personal property. In this manner, it becomes easier to engage the personal property in the apparatus, because of the larger target area of aperture 8 created by the configuration shown in FIG. 1.

Figure 2:
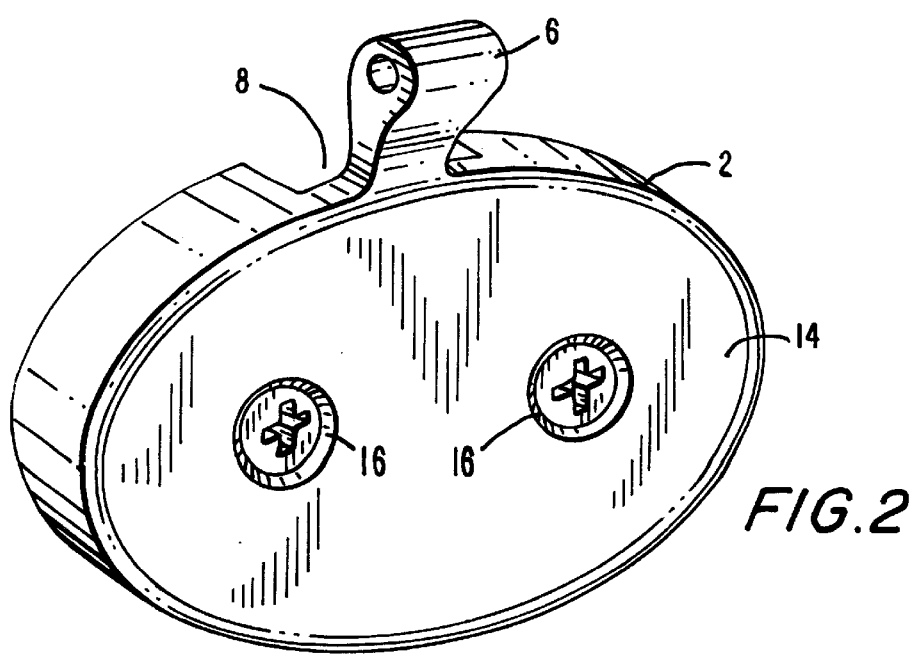
FIG. 2 is a rearward, assembled perspective view of a preferred embodiment of the subject invention shown in FIG. 1.

FIG. 2 shows the rear view of the apparatus shown in FIG. 1, specifically including a backing plate 14 and screws 16. In this embodiment, the backing plate 14 is shown to be substantially flat. However, in other embodiments the backing plate can be curved to follow any surface of attachment, as the case may be. Moreover, backing plate 14 can be configured to include an adhesive peal-off material, such that the pealable layer can be removed, and the adhesive applied to engage the apparatus to a surface, whereupon it can be used repeatedly for the carriage of personal property.

Figure 3:
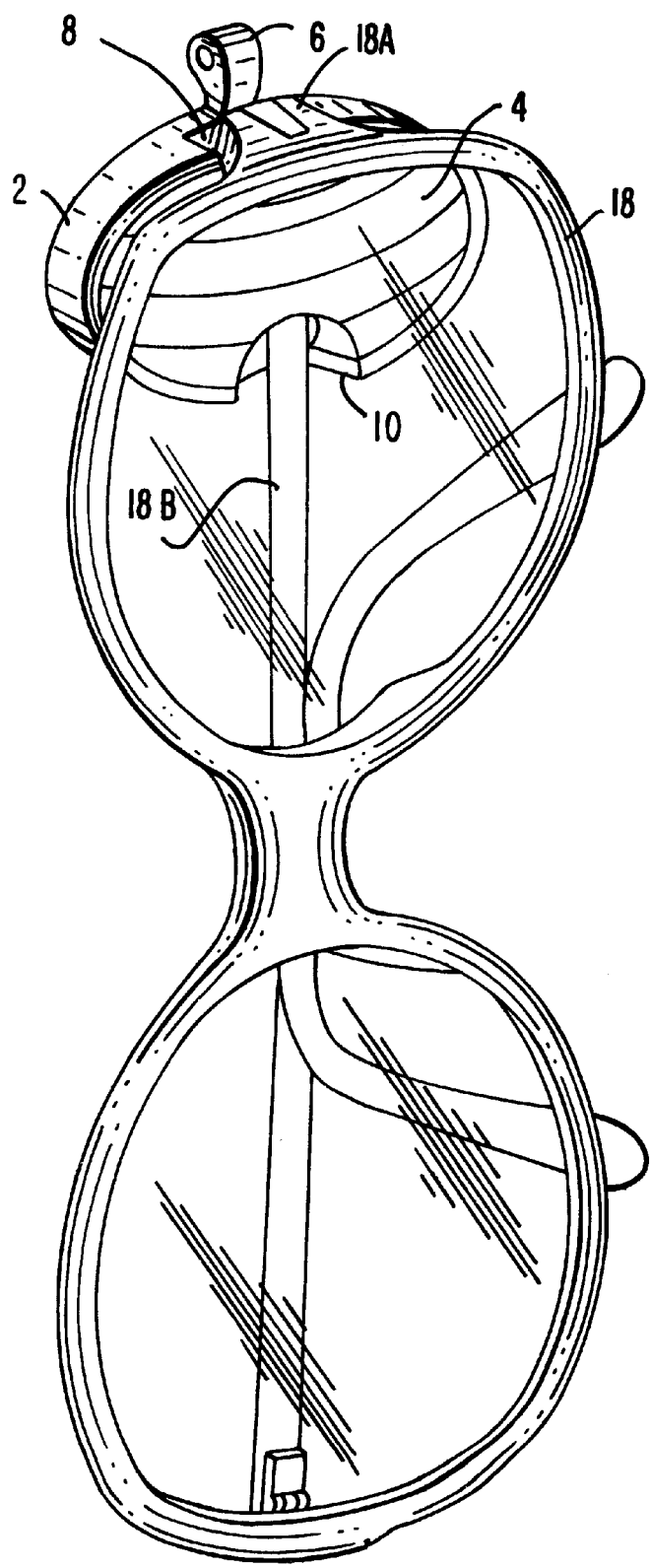
FIG. 3 is a perspective view of the subject invention showing a pair of eyeglasses in the engaged mode of removable attachment.

FIG. 3 shows optimal engagement of a pair of eyeglasses having lense portions 18, hinge portion 18A, and temple side pieces 18B, in the apparatus in accordance with the embodiment shown in FIG. 1. In particular, one temple side piece 18B has been inserted through aperture 8 and through chamber 10, such that the hinge portion 18A rests on the ledge created by the configuration of aperture 8 and can be easily stored and removed. It should be appreciated that where a chain engages hook 6, and the apparatus with a pair of eyeglasses is attached around the neck of a person, all of the drawbacks inherent in the prior art are removed. Specifically, the glasses are stored in a closed, vertical position to avoid their becoming a ledge for deposit of food material or being easily broken by compression from hugging or other physical activity, both negative results from normal chain assemblies fastened to the terminus of the temple side pieces. Also, because access is simple and enabled, the eyeglasses can easily be removed and used, without the appearance of chains engaged to the terminus of the temple side pieces. Moreover, no hard case is necessary.

It should also be appreciated by the engaged, retained embodiment shown in FIG. 2, that the weight, geometry and configuration of the apparatus aid in its retention of the eyeglasses. In particular, the apparatus is substantially less thick than it is long and wide, thereby minimizing torsional twisting of the apparatus, as the back plate lies flush against the chest of the wearer. Also, because of the configuration, the eyeglasses are less apt to be unintentionally dislodged from their engaged, retained position, because of the forces of gravity against the configuration of the apparatus. Additionally the length of the chamber 10 is such that adds to the effect of preventing the eyeglasses from torsionally moving outwardly from the body of the user. Thus, in this fashion the eyeglasses are easily retained, and likewise easily removed.

Also, selection of material is important, in that, in the preferred embodiment, the apparatus is comprised of a metallic material which adds necessary density. In this malner, the apparatus is weighted, and less apt to be dislodged when against a wearer's chest.

Additionally, when a chain is engaged in hook 6, the apparatus can be attached to any body limb or waste, dependent upon the needs of the wearer, and still provide comfortable retention of eyeglasses and other items of personal property. It can also be attached to a belt. In this regard, aperture 8 and chamber 10 can be expanded (without deviation in geometrical design) to accommodate an arm of cellular telephone case, or a tube of lipstick, a pen, or any other item of personal property that has some form of clip for engagement.

Also, as can be observed by the appearance of the device, care has been given to its ergonomic functionality to enable the elimination of an unsightly appearance and to provide full and efficient use.

Figure 4:
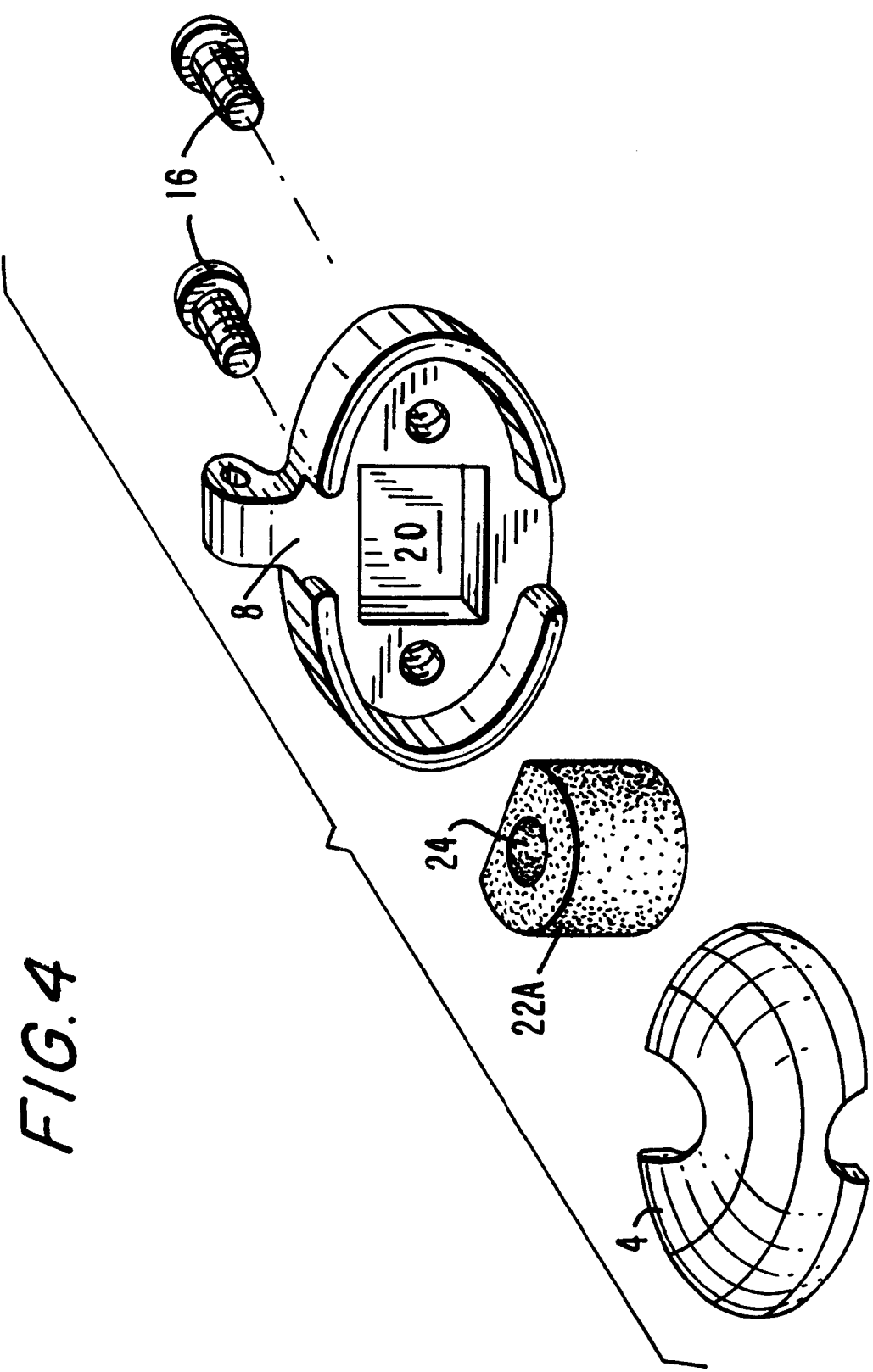
FIG. 4 is an exploded, disassembled view of an embodiment of the subject invention.

FIG. 4 shows an exploded view of an additional embodiment wherein a crevice 20 is created for engagement of a clutching assembly 22A. Clutching assembly 22A enhances the performance of the apparatus, because without the clutch, eyeglasses may wobble a bit within chamber 10. In order to avoid such wobbling, and prevent even the remote accidental dislodgement of eyeglasses from their residence within the apparatus, various clutching assemblies, including that shown as 22A, and further described below are shown. In particular, clutching assembly 22A is comprised of a resilient, compressible material, like a foam, and has an opening 24 that provides access for temple eye piece portions to be pushed through. The material can include a laminated, non-abrasive covering material for preventing snags, like an exoskin, within the confines of opening 24 to enable easier insertion. The nature of the material used in 22A, as well as the other compressable materials shown below, is such that deformation occurs to accommodate entry of a temple side piece and retention of that side piece, but has limited memory, such that upon removable of the side piece, the material returns substantially to its original configuration, but during engagement, molds about the temple side piece.

Figure 5:
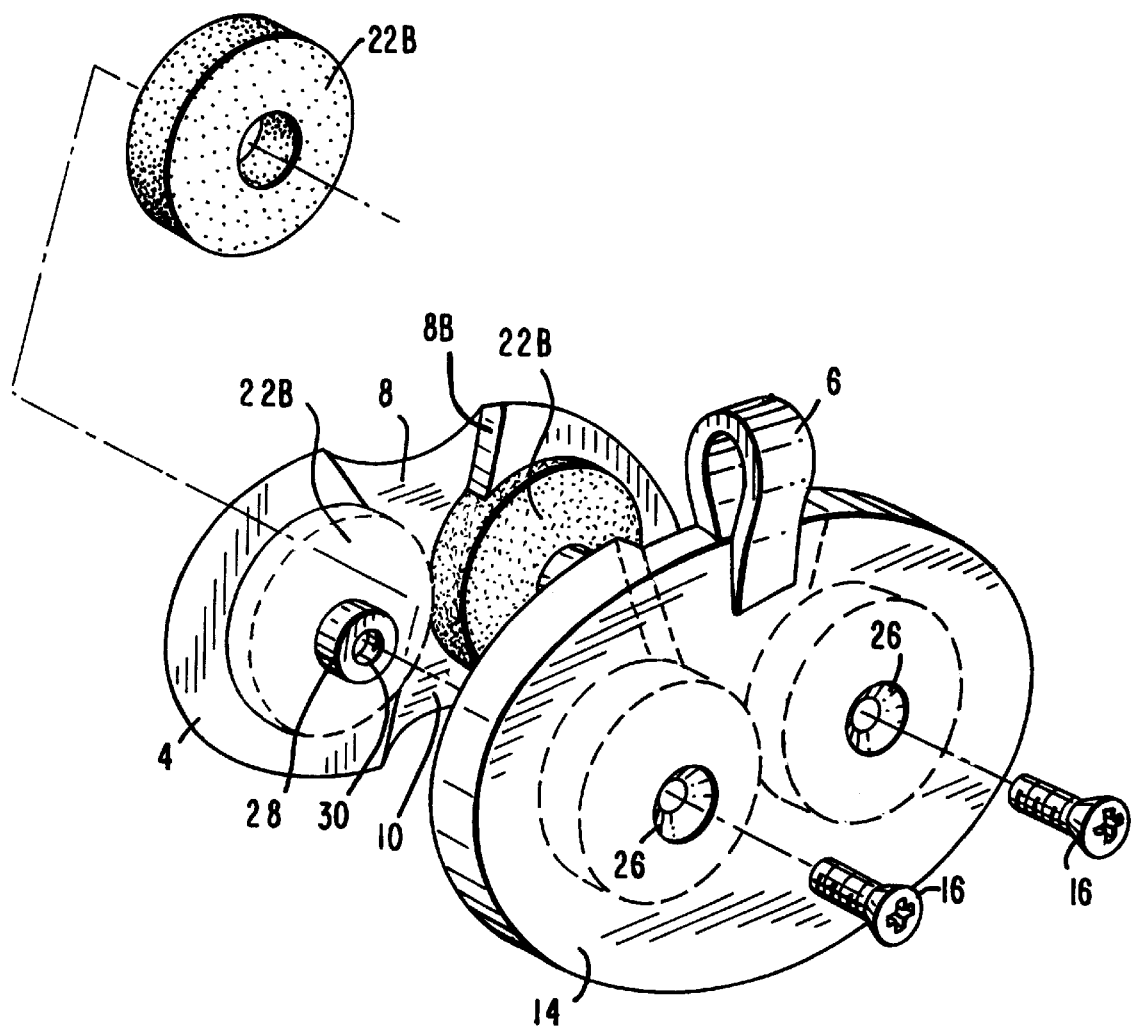
FIG. 5 is an exploded perspective view of a preferred embodiment of the subject invention showing the dual-roller clutch assembly for frictional, removable attachment of personal property.

FIG. 5 shows the preferred embodiment of the subject invention, wherein clutching assembly 22B is shown comprised of a pair of rollers. In this embodiment, the compressible pads or rollers 22B can be replaced by opening the apparatus. Accordingly, where there is wear and tear on the rollers 22B, their replacement can provide for longer use of the device.

FIG. 5 also shows bosses 28 surrounding tapped posts 30. Tapped posts 30 allow engagement of screws 16 as they pass through apertures 26 in back plate 14 for opening and closing the apparatus. Bosses 28 provide for engagement of rollers 22B there-around. In this embodiment, then, as temple side pieces are inserted into aperture 8, the dual rollers 22B engage the side piece and pivot about bosses 28 as the side piece is inserted and thereafter removed. Rollers 22B are comprised of compressible, resilient material such that they provide resistance against accidental dislodgement of the side piece, as well as vibrational action.

Also shown in FIG. 5 is elongation or ramp 8B which provides for easy tracking and targeting as a side piece is inserted into the assembly. In this manner it can be observed that a larger aperture 8 is accommodated for such easier targeting and tracking.

Figure 6A:
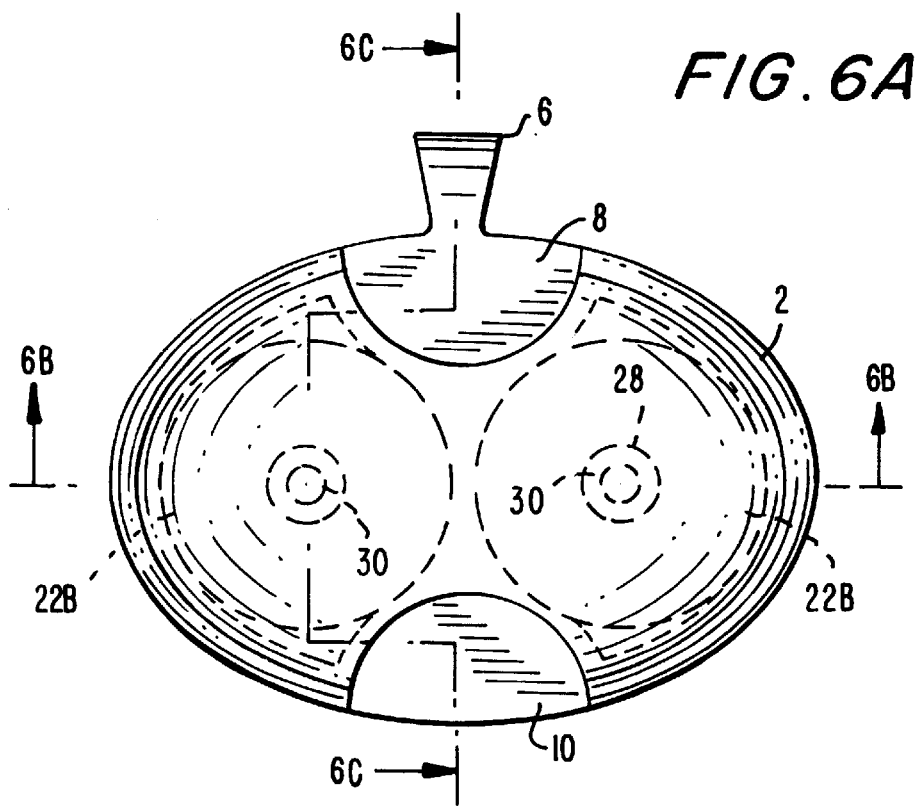
FIG. 6A is a transverse, cutaway view of the embodiment shown in FIG. 5.

FIG. 6A shows a transverse, cutaway view of the embodiment shown in FIG. 5, in which like elements have the same numbers. Thus, it can be observed that rollers 22B are positioned in a manner that allows entry of a side piece or other clippable portion of personal property.

Figure 6B:
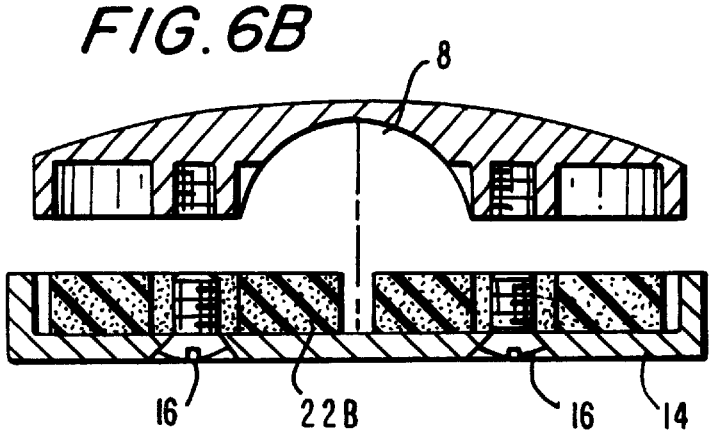
FIG. 6B is an exploded, disassembled cross-sectional view of the embodiment shown in FIG. 6A.

FIG. 6B is an exploded cross-sectional view of FIG. 6A showing aperture 8 and rollers 22B.

Figure 6C:
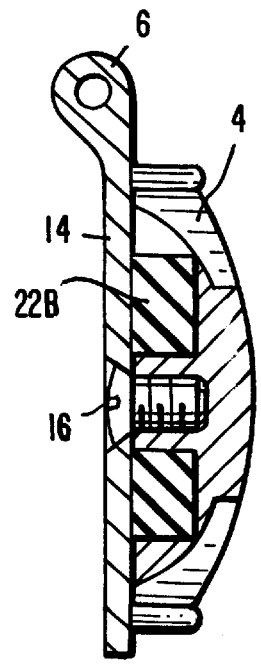
FIG. 6C is an assembled, cross-sectional view of the embodiment shown in FIG. 6A.

FIG. 6C is another cross-sectional view, of FIG. 6A showing front portion 4, rollers 22B, screw 16, hook 6 and back plate 14.

FIG. 7A shows an alternative embodiment to the dual rollers 22B described herein above, in particular having a wedge-shaped clutching assembly 22C placed in chamber 10. This wedge-shaped configuration (trapezoidal in cross-section), with an additional wedge shown in FIG. 7B provide a targeted area for side piece members, and also allow compression against such members for all of the benefits indicated above.

FIG. 7C shows an alternative embodiment to the wedges shown in FIG. 7A and FIG. 7B, in this instance being comprised of cubically configured insert member 22D, of a unitary design, having an opening 24 through which a side piece can be inserted, and also having a flat top and bottom. Removability and replaceability of the wedge assembly 22C and unitary cubically configured member of 22D are observable in these configurations.

FIG. 8A, FIG. 8B and FIG. 8C show yet an additional replaceable cubically configured insert member 22E having sloped walls 32 and opening 24. The advantage of the sloped walls, as shown in FIG. 8B with side piece 18B, enables easier targeting and tracking regardless of the direction in which the side piece 18B is inserted, and also allows clutching to occur.

Figure 9A:
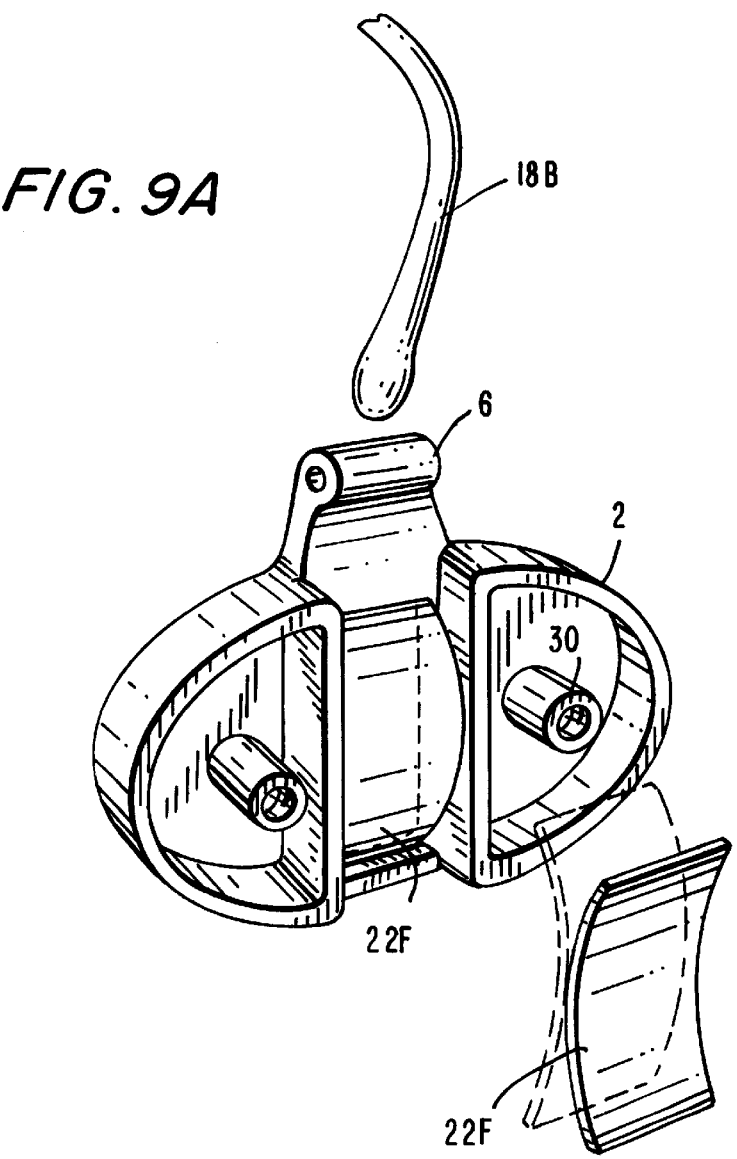
FIG. 9A is a disassembled, internal perspective view of an alternative embodiment of the subject invention showing dual, confrontingly, springingly opposed, semicircular spring members for providing clutchable engagement of a temple sidepiece of a pair of eyeglasses.
Figure 9B:
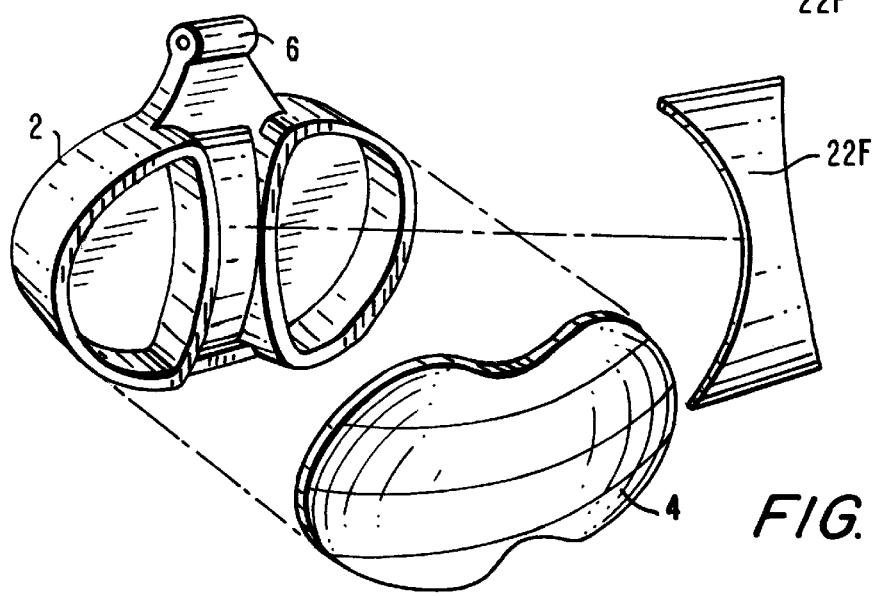
FIG. 9B is a partially assembled, partially exploded view of the a further alternative embodiment of the subject invention showing a single semicircular spring member.

FIG. 9A and FIG. 9B shows an alternative embodiment having one or two semi-circular spring members 22F. Such members can also be coated to increase longevity and decrease frictional resistance against side pieces during use. As shown in FIG. 9A, two springingly, confrontingly opposed springed members 22F are shown, creating a gap for insertion of the side piece, as well as a channel for targeting. The confronting opposition provides resistance to wobble and accidental dislodgement. FIG. 9B shows a single spring member 22F, in which resistance is provided between the spring member 22F and the front portion 4.

Figure 10A:
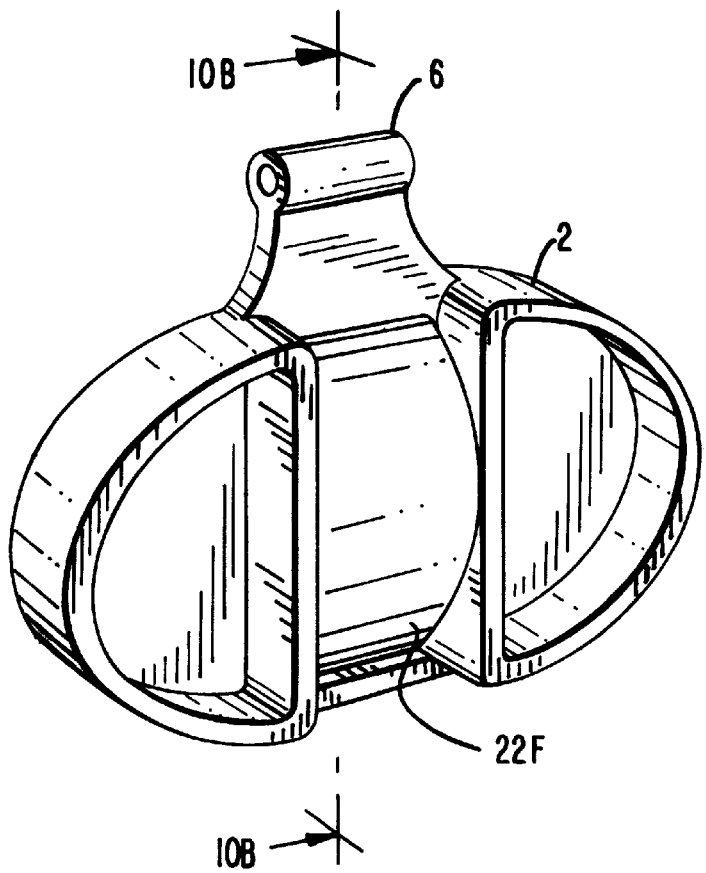
FIG. 10A is a frontal, internal view of an alternative embodiment of the subject invention showing the hooking flange and single, semicircular spring member comprised of a single piece of material.
Figure 10B:
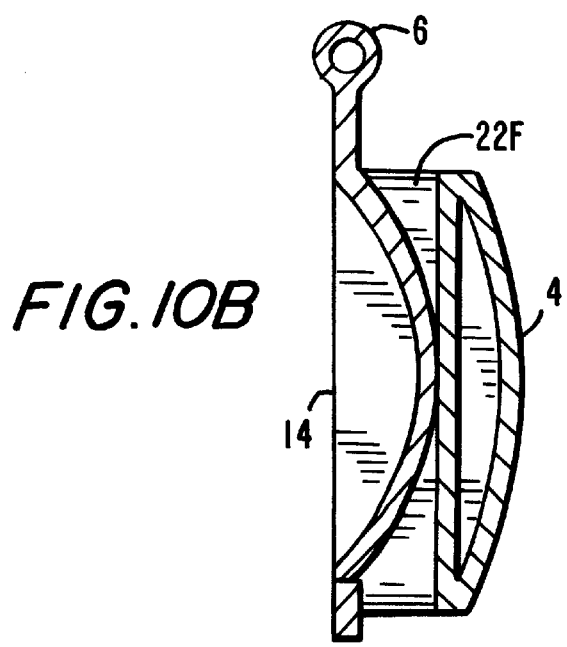
FIG. 10B is a cross-sectional view of the embodiment shown in FIG. 10A.

Lastly, FIG. 10A and 10B show a single, unitary design wherein hook 6 is extended to include spring member 22F. Compression occurs in the same manner as FIG. 9B, however, simplicity of design and construction, without compromise in functionality is shown.

It should be understood that the preferred embodiments and examples described are for illustrative purposes only and are not to be construed as limiting the scope of the present invention which is properly delineated only in the appended claims.

What is claimed is:

1. An apparatus for the removable retention of an item of personal property, comprising:
   (a) a back region for attachment to a surface;
   (b) a front region for engagement of the item;
   (c) a substantially vertical aperture region defined within and between said front and back region, said aperture region having: (1) a topward opening for initial, vertical, slidable engagement of at least a portion of the item and for retention of the item after engagement; and (2) a chamber region below said topward opening for containment of the at least a portion of the item after engagement; and
   (d) a resiliently compressable clutching assembly for the engagement and retention of the at least a portion of the item, said clutching assembly housed within and between said front and back region, and comprising an opposing pair of rollers, in which a portion of each of said rollers extends within said chamber region, at a radial distance from the centers of the rollers.

2. The apparatus of claim 1, wherein said rollers are confrontingly opposed such that there is between a minimal and zero gap between a respective point of their circumferences.

3. The apparatus of claim 1, wherein said clutching assembly comprises at least one semi-circular spring member.

4. The apparatus of claim 1, wherein said clutching assembly and said back member are comprised of a single, unitary material.

5. The apparatus of claim 1, wherein said apparatus has a length, width and thickness, such that the area comprising length times width is substantially greater than said thickness.

6. The apparatus of claim 1, wherein said apparatus is comprised of dense material.

7. The apparatus of claim 6, wherein said dense material is metallic.

8. The apparatus of claim 1, wherein said compressable clutching assembly includes a resilient polymeric material.

9. The apparatus of claim 8, wherein said polymeric material is foam.

10. An apparatus for the removable retention of an item of personal property, comprising:
    (a) a back region for attachment to a surface;
    (b) a front region for engagement of the item;
    (c) a substantially vertical aperture region defined within and between said front and back region, said aperture region having: (1) a topward opening for initial, vertical, slidable engagement of at least a portion of the item and for retention of the item after engagement; and (2) a chamber region below said topward opening for containment of the at least a portion of the item after engagement; and
    (d) a resiliently compressable clutching assembly for the engagement and retention of the at least a portion of the item, said clutching assembly housed within and between said front and back region, and comprising at least one semi-circular spring member.

11. The apparatus of claim 10, wherein said at least one semi-circular spring member comprises a pair of confrontingly, springingly opposed semi-circular spring members.

12. An apparatus for the removable retention of an item of personal property, comprising:
    (a) a back region for attachment to a surface;
    (b) a front region for engagement of the item;
    (c) a substantially vertical aperture region defined within and between said front and back region, said aperture region having: (1) a topward opening for initial, vertical, slidable engagement of at least a portion of the item and for retention of the item after engagement; and (2) a chamber region below said topward opening for containment of the at least a portion of the item after engagement; and
    (d) a resiliently compressable clutching assembly for the engagement and retention of the at least a portion of the item, said clutching assembly housed within and between said front and back region, and comprising a cubically-configured insert member, having a central chamber.

13. The apparatus of claim 12, wherein said central chamber is rectilinear.

14. The apparatus of claim 12, wherein said central chamber is cylindrical.

15. The apparatus of claim 12, wherein an upper and lower surface of said insert member are sloped.

* * * * *